United States Patent [19]

Esposito

[11] Patent Number: 5,499,574
[45] Date of Patent: Mar. 19, 1996

[54] VERTICALLY ORIENTED DUEL GRILL

[76] Inventor: Michael Esposito, 10 Viking Ct., Nesconset, N.Y. 11767

[21] Appl. No.: 373,757

[22] Filed: Jan. 17, 1995

[51] Int. Cl.⁶ ................................................. A47J 37/08
[52] U.S. Cl. ........................ 99/339; 99/389; 126/25 R; 126/41 R
[58] Field of Search ................... 126/25 R, 25 A, 126/25 B, 41 R, 39 R; 99/389, 390, 339, 444, 447

[56] References Cited

U.S. PATENT DOCUMENTS

| | | | |
|---|---|---|---|
| 2,821,127 | 1/1958 | Hess | 126/41 R |
| 2,923,229 | 2/1960 | Halford | 99/390 |
| 3,140,651 | 7/1964 | Barnett | 126/25 R |
| 3,154,005 | 10/1964 | Roecks et al. | 99/389 |
| 3,276,351 | 10/1966 | Sundholm | 126/25 R |
| 3,742,838 | 7/1973 | Luschen et al. | 126/25 R |

*Primary Examiner*—James C. Yeung
*Attorney, Agent, or Firm*—Michael I. Kroll

[57] ABSTRACT

A vertically oriented duel grill comprising a generally upstanding box-shaped housing having a latitudinal front opening with a cooking chamber therein. A structure is provided for holding food to be cooked. A component is for vertically suspending the holding structure within the cooking chamber in the housing through the front opening. A facility within the cooking chamber is for supplying heat to opposite sides of the holding structure. The food can be cooked on both sides simultaneously, while any fats and liquids from the food can drip down away from the food.

3 Claims, 2 Drawing Sheets

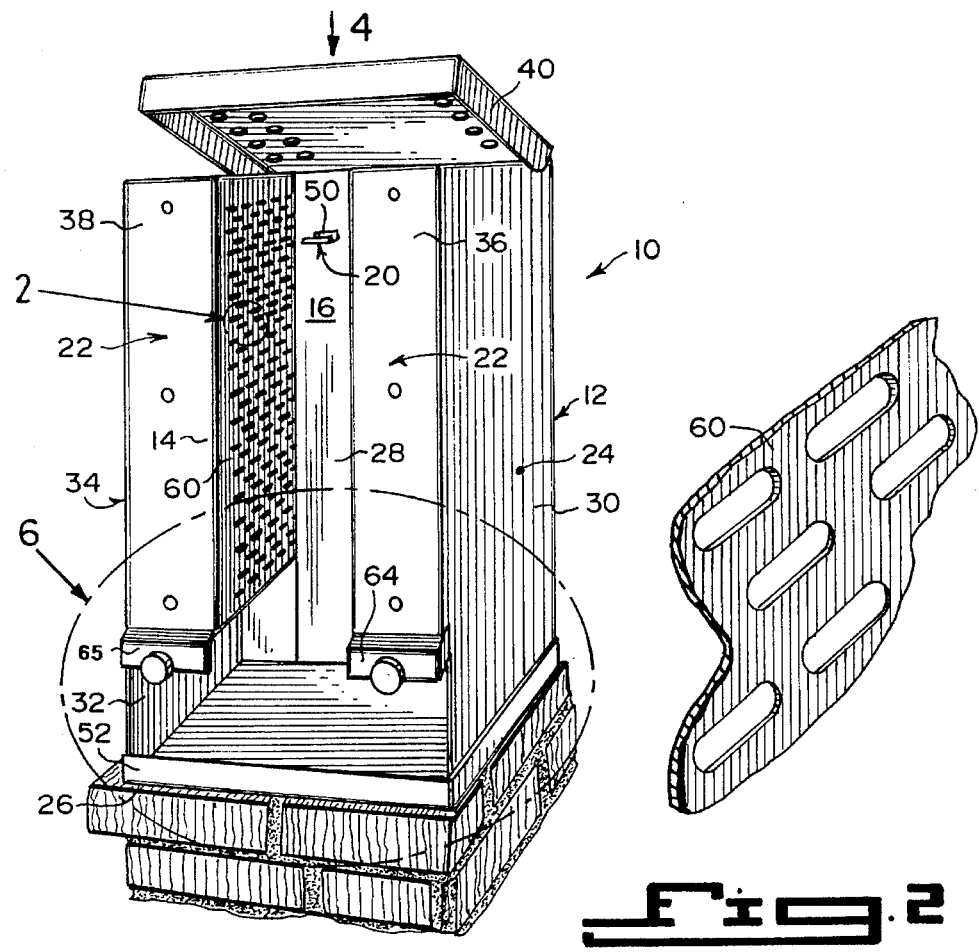
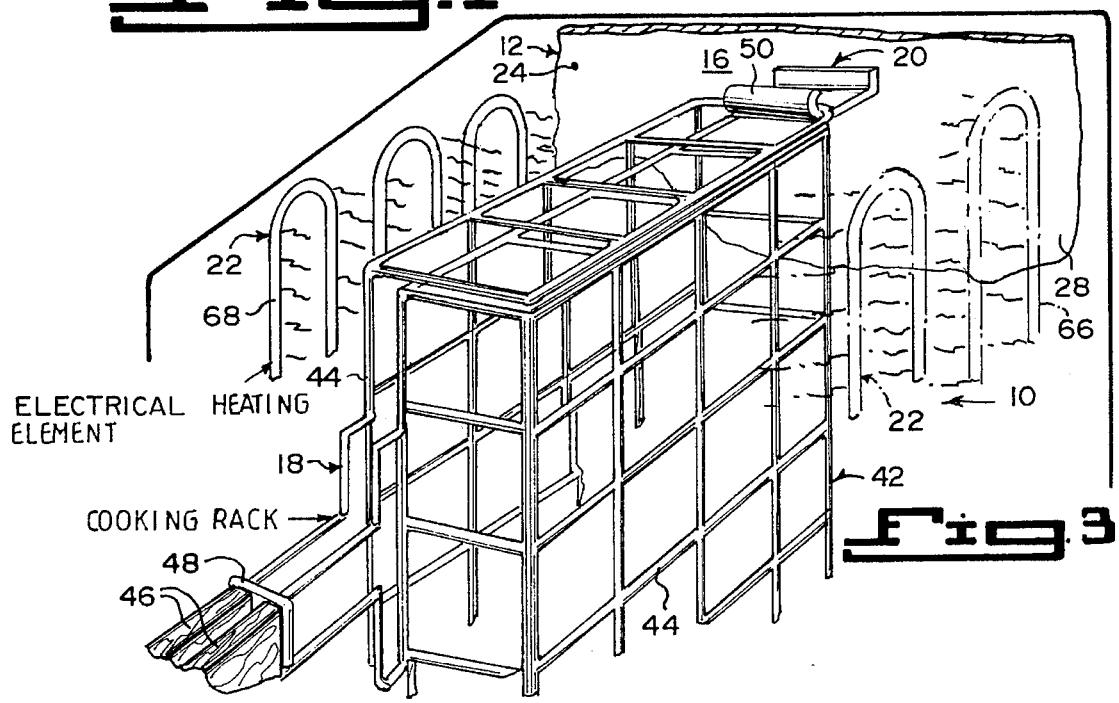

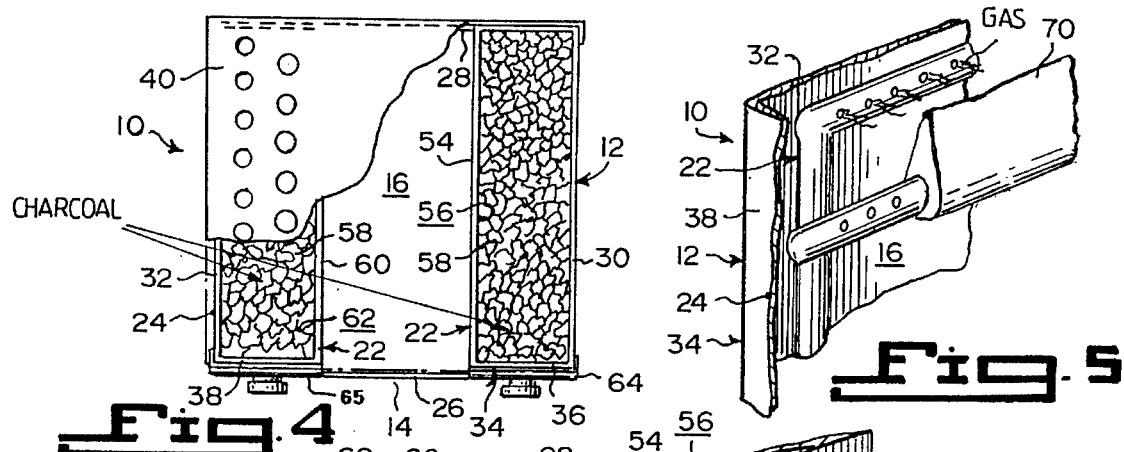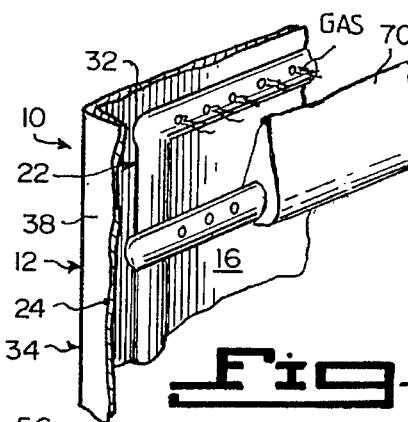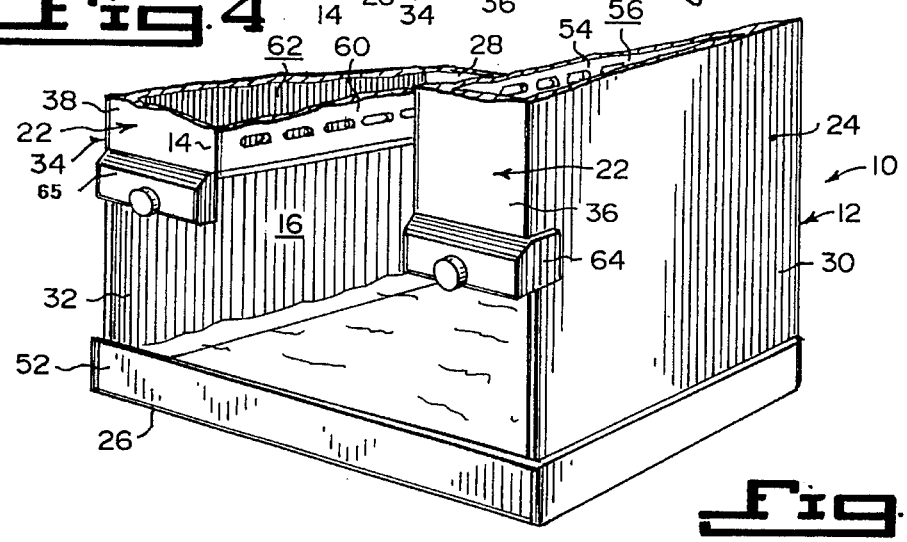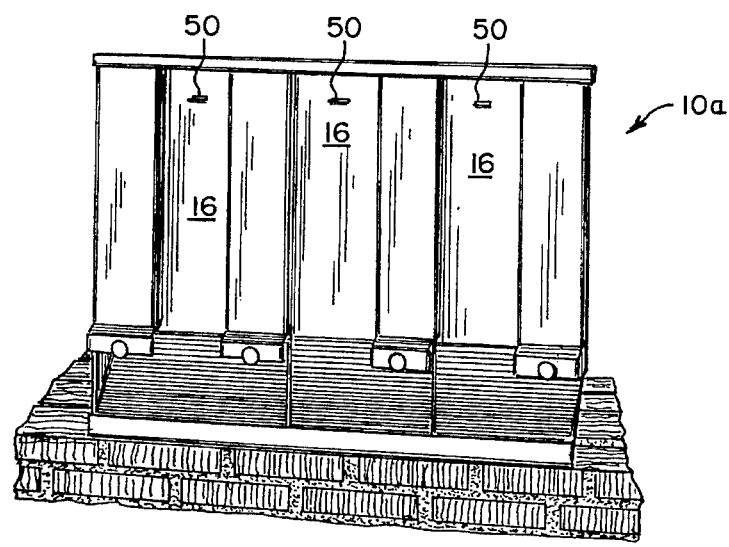

VERTICALLY ORIENTED DUEL GRILL

BACKGROUND OF THE INVENTION

1. Field of the Invention

The instant invention relates generally to cooking equipment and more specifically it relates to a vertically oriented duel grill.

2. Description of the Prior Art

Numerous cooking equipment have been provided in prior art that are adapted to cook meat or like food materials by the direct action of heat emanating from suitable heat sources. For example, U.S. Pat. No. 161,856 to Bliss; 624,356 to Lurie et al.; 2,860,225 to Stean and 3,324,788 to LaFrance all are illustrative of such prior art. While these units may be suitable for the particular purpose to which they address, they would not be as suitable for the purposes of the present invention as heretofore described.

BLISS, GEORGE H.

IMPROVEMENT IN BROILERS

U.S. PAT. NO. 161,856

In a culinary apparatus for broiling steaks and cooking other articles, the combination of a vessel, closed at the top by a suitable cover and opened at the bottom and adapted to be used upon the top of a stove or range, by being placed over an opening therein, directly over the fire. A double-leaved folding gridiron or skeleton food holder is supported vertically therein, in a position to admit a free and equal access of the heat from the fire to both sides thereof, to cook both sides of the food contained therein, without turning.

LURIE, ABRAHAM

BILOON, LOUIS

TOASTING AND BROILING APPARATUS

U.S. PAT. NO. 624,356

A toasting and broiling apparatus, comprising a burner having opposite screen-covered openings for the passage of the flame-producing material. A deflector-plate extends along each opening. The flame is directed in sheets along the burner side. A holder for material to be treated is removably supported by the burner and consists of opposite walls of wire-netting. A skeleton frame is provided, to which the walls are rigidly attached.

STEEN, CART AUGUST

ELECTRIC HEATING APPARATUS

U.S. PAT. NO. 2,860,225

An electric apparatus for heating articles of food comprising a closed casing having a hinged door at one side. A continuous supporting metal plate for the articles of food extends between two side walls of the casing, so as to shield off heat radiation from above and from below. An electric heating device is provided below the supporting plate at the bottom of the casing for heating the plate from below. A plurality of heating units radiate substantially only dark infra-red rays. The heating units extend freely only from one side wall of the casing to the opposite side wall thereof close below the top wall of the casing and are evenly distributed in their transverse direction opposite to the plate. The heating units are further provided with an outer, electrically insulated metal tube. A plurality of channel-shaped metal reflectors each embrace one of the heating units, so as to shield off infra-red radiation from reaching the side walls of the casing and to concentrate them evenly towards the plate.

LaFRANCE, HAZEL M.

BARBEQUE CONSTRUCTION

U.S. PAT. NO. 3,324,788

The barbecue cooker of this invention has an outer housing with interior walls with an insulated air space between. The barbecue has a top to control heated convective air and prevent its escape. Fire boxes lie on each of the sloping walls and a grill lies between the fire boxes. Heat from the fire boxes causes heating and rising of convective air, which is returned through the center of the cooking compartment where the grill is located. Thus, the grill is located for convective cooking of materials. An ash receiver is provided to receive ashes from the fire boxes.

SUMMARY OF THE INVENTION

A primary object of the present invention is to provide a vertically oriented duel grill that will overcome the shortcomings of the prior art devices.

Another object is to provide a vertically oriented duel grill that will cook both sides of food retained in a removable cooking rack in a vertical position within the grill, whereby the fat and liquids of the food will automatically drain therefrom into a drip pan.

An additional object is to provide a vertically oriented duel grill in which a heat source is positioned on both sides of the cooking rack that can be a charcoal, gas fire, or an electrical heating element.

A still additional object is to provide a vertically oriented duel grill that will prevent the fats from coming in contact with the heat source, thereby preventing carcinogens from building up on the food being cooked.

A further object is to provide a vertically oriented duel grill that is simple and easy to use.

A still further object is to provide a vertically oriented duel grill that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 1 is a front perspective view of a first embodiment of the instant invention being a charcoal heating type with the cover partly opened and the cooking rack removed.

FIG. 2 is an enlarged perspective view of a portion of the left inner side perforated partition wall as indicated by arrow 2 in FIG. 1.

FIG. 3 is an enlarged front perspective view of a portion of a second embodiment of the instant invention being an electrical heating type with the cooking rack suspended therein, FIG. 4 is a top view with the cover broken away taken in the direction of arrow 4 in FIG. 1, showing the charcoal therein, FIG. 5 is an enlarged front perspective view of a portion of a third embodiment of the instant invention being a gas ceramic heating type, FIG. 6 is an enlarged front perspective view of a lower portion of the first embodiment as indicated by arrow 6 in FIG. 1.

FIG. 7 is a front perspective view showing a multiple cooking chamber charcoal heating type with all of the cooking racks removed therefrom.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the several views, FIGS. 1 through 6 illustrate a vertically oriented duel grill 10, comprising a generally upstanding box-shaped housing 12 having a latitudinal front opening 14 with a cooking chamber 16 therein. A structure 18, shown in FIG. 3, is provided for holding food to be cooked. A component 20 is for vertically suspending the holding structure 18 within the cooking chamber 16 in the housing 12 through the front opening 14. A facility 22 within the cooking chamber 16 is for supplying heat to opposite sides of the food holding structure 18. The food can be cooked on both sides simultaneously, while any fats and liquids from the food can drip down away from the food and the heat supplying facility 22, thereby preventing the build up of carcinogens on the food being cooked.

The housing 12 is fabricated out of a heat resistant material 24. The housing 12 consists of a bottom wall 26. A rear wall 28 extends upwardly from the bottom wall 26. A right side wall 30 extends upwardly from the bottom wall 26. A left side wall 32 extends upwardly from the bottom wall 26. A front wall 34 is divided into two latitudinal segments 36 and 38, thereby having the front opening 14 and is suspended upwardly above the bottom wall 26, so as to form the cooking chamber 16 therein. The housing 12 further includes a perforated removable top cover 40, to fit over the cooking chamber 16 in the housing 12.

The food holding structure 18 is a cooking rack 42. The cooking rack 42 contains a pair of folding skeletal leaves 44. A pair of handles 46 are provided, with each extending from one skeletal leaf 44. A clamp 48 is over the handles 46, for holding the skeletal leaves 44 together.

The vertical suspending structure 20 is a bracket hook 50 affixed to the back wall 28 at an upper center interior surface in the cooking chamber 16 behind the front opening 14 in the front wall 34. The housing further includes a pullout drip pan 52 located over the bottom wall 26, so as to catch the fats and liquids that drip down from the food in the cooking rack 42 in the cooking chamber 16.

The heat supplying facility 22, as shown in FIGS. 1, 2, 4 and 6, can consist of a right inner side perforated partition wall 54 spaced parallel away from the right side wall 30 between the first segment 36 of the front wall 34 and the rear wall 28, to form a first heating compartment 56 for charcoal 58 to be deposited and heated therein. A left inner side perforated partition wall 60 is spaced parallel away from the left side wall 32 between the second segment 38 of the front wall 34 and the rear wall 28, to form a second heating compartment 62 for charcoal 58 to be deposited and heated therein. The heat supplying facility 22 can further include a first pullout ashtray 64 under the first heating compartment 56. A second pullout ashtray 65 is under the second heating compartment 62.

The heat supplying facility 22, as shown in FIG. 3, can consists of a right electrical heating element 66 positioned vertically adjacent an inner surface of the right side wall 30. A left electrical heating element 68 is positioned vertically adjacent an inner surface of the left side wall 32.

The heat supplying facility 22 in FIG. 5, can include a right gas ceramic heating element (not shown) positioned vertically adjacent an inner surface of the right side wall 30. A left gas ceramic heating element 70 is positioned vertically adjacent an inner surface of the left side wall 32.

FIG. 7 shows a modified vertically oriented duel grill 10a. It is similar to the charcoal heating type illustrated in FIGS. 1, 2, 4 and 6, but it contains multiple cooking chambers 16. In this way, multiple cooking racks 42 can be utilized. Each cooking rack 42 can engage with a bracket hook 50 in each cooking chamber 16. Multiple or different types of foods can be cooked at once utilizing this grill 10a.

LIST OF REFERENCE NUMBERS 10 vertically oriented duel grill
10a modified vertically oriented duel grill
12 generally upstanding box-shaped housing
14 latitudinal front opening in 12
16 cooking chamber in 12
18 food holding structure
20 vertical suspending structure
22 heat supplying facility in 16
24 heat resistant material of 12
26 bottom wall of 12
28 rear wall of 12
30 right side wall of 12
32 left side wall of 12
34 front wall of 12
36 first latitudinal segment of 34
38 second latitudinal segment of 34
40 perforated removable top cover of 12
42 cooking rack for 18
44 skeletal leaf of 42
46 handle of 42
48 clamp on 46
50 bracket hook for 20
52 pullout drip pan
54 right inner side perforated partition wall
56 first heating compartment
58 charcoal
60 left inner side perforated partition wall
62 second heating compartment
64 first pullout ashtray
65 second pullout ashtray
66 right electrical heating element of 22
68 left electrical heating element of 22
70 left gas ceramic heating element of 22

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A vertically oriented duel grill comprising:
  a) a generally upstanding box-shaped housing having a latitudinal front opening with a cooking chamber therein, said housing being fabricated out of a heat resistant material, said housing including a bottom wall, a rear wall extending upwardly from said bottom wall, a right side wall extending upwardly from said bottom wall, a left side wall extending upwardly from said bottom wall, and a front wall divided into two latitudinal segments thereby having said front opening and suspended upwardly above said bottom wall, so as to form said cooking chamber therein, said housing further including a perforated removable top cover to fit over said cooking chamber in said housing, said housing further including a pullout drip pan located over said bottom wall, so as to catch the fats and liquids that drip down from the food in said cooking rack in said cooking chamber;
  b) means for holding food to be cooked, said food holding means being a cooking rack, said cooking rack including a pair of folding skeletal leaves, a pair of handles, each extending from one said skeletal leaf, and a clamp over said handles for holding said skeletal leaves together;
  c) means for vertically suspending said holding means within said cooking chamber in said housing through said front opening, said vertical suspending means being a bracket hook affixed to said back wall at an upper center interior surface in said cooking chamber behind said front opening in said front wall; and
  d) means within said cooking chamber for supplying heat to opposite sides of said food holding means, so that the food can be cooked on both sides simultaneously, while any fats and liquids from the food can drip down away from the food and the heat supply means, thereby preventing the build up of carcinogens on the food being cooked, said heat supplying means including a right inner side perforated partition wall spaced parallel away from said right side wall between said first segment of said front wall and said rear wall, to form a first heating compartment for charcoal to be deposited and heated therein, and a left inner side perforated partition wall spaced parallel away from said left side wall between said second segment of said front wall and said rear wall, to form a second heating compartment for charcoal to be deposited and heated therein, said heat supplying means further including a first pullout ashtray under said first heating compartment, and a second pullout ashtray under said second heating compartment.

2. A vertically oriented duel grill as recited in claim 1, wherein said heat supplying means includes:
  a) a right electrical heating element positioned vertically adjacent an inner surface of said right side wall; and
  b) a left electrical heating element positioned vertically adjacent an inner surface of said left side wall.

3. A vertically oriented duel grill as recited in claim 1, wherein said heat supplying means includes:
  a) a right gas ceramic heating element positioned vertically adjacent an inner surface of said right side wall; and
  b) a left gas ceramic heating element positioned vertically adjacent an inner surface of said left side wall.

* * * * *